United States Patent
Gaiduk et al.

(10) Patent No.: US 10,948,705 B2
(45) Date of Patent: Mar. 16, 2021

(54) DEVICE AND METHOD FOR CAPTURING IMAGES

(71) Applicant: Carl Zeiss Microscopy GmbH, Jena (DE)

(72) Inventors: Alexander Gaiduk, Jena (DE); Markus Sticker, Jena (DE); Lars Stoppe, Jena (DE); Ralf Wolleschensky, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 253 days.

(21) Appl. No.: 16/065,263

(22) PCT Filed: Dec. 22, 2016

(86) PCT No.: PCT/EP2016/082347
§ 371 (c)(1),
(2) Date: Jun. 22, 2018

(87) PCT Pub. No.: WO2017/109053
PCT Pub. Date: Jun. 29, 2017

(65) Prior Publication Data
US 2019/0004304 A1    Jan. 3, 2019

(51) Int. Cl.
G02B 21/12    (2006.01)
G02B 21/10    (2006.01)
(Continued)

(52) U.S. Cl.
CPC ....... *G02B 21/125* (2013.01); *G02B 21/0064* (2013.01); *G02B 21/0068* (2013.01);
(Continued)

(58) Field of Classification Search
CPC .... G02B 21/125; G02B 21/10; G02B 21/084; G02B 21/0064; G02B 21/0068; G02B 27/1066
See application file for complete search history.

(56) References Cited

U.S. PATENT DOCUMENTS 5,657,402 A * 8/1997 Bender ................. G06T 3/4038
348/218.1
2008/0024868 A1* 1/2008 Okamura .............. G01J 3/0251
359/599

(Continued)

FOREIGN PATENT DOCUMENTS

CN    102375228 A    3/2012
DE    3906555        7/1989
(Continued)

OTHER PUBLICATIONS

Office Action with English language translation of Search Report, CN Application No. 201680075911.8, dated Mar. 16, 2020, 10 pp.
(Continued)

*Primary Examiner* — Jade R Chwasz
*Assistant Examiner* — Rahman Abdur
(74) *Attorney, Agent, or Firm* — Myers Bigel, P.A.

(57) ABSTRACT

A device for recording images is provided, an image-recording device and an illumination device being arranged on the same side of a specimen plane in said device. The image-recording device has illumination portions, for example individual light sources, which are actuatable independently of one another in order to be able to illuminate a specimen in the specimen plane at different angles and/or from different directions. In this way, it is possible to record a plurality of images with different illuminations, which can be combined to form a results image with improved properties.

12 Claims, 16 Drawing Sheets

(51) Int. Cl.
  *G02B 21/08* (2006.01)
  *G02B 21/00* (2006.01)
  *G02B 27/10* (2006.01)

(52) U.S. Cl.
  CPC .......... *G02B 21/084* (2013.01); *G02B 21/10* (2013.01); *G02B 27/1066* (2013.01)

(56) References Cited

U.S. PATENT DOCUMENTS

| | | | |
|---|---|---|---|
| 2008/0049312 A1 | 2/2008 | Obrebski | |
| 2009/0109285 A1 | 4/2009 | Tobiason et al. | |
| 2011/0025880 A1* | 2/2011 | Nandy | G06T 5/50 |
| | | | 348/226.1 |
| 2012/0044340 A1 | 2/2012 | Yamamoto | |
| 2013/0229707 A1* | 9/2013 | Sakaguchi | G02B 27/1066 |
| | | | 359/372 |
| 2015/0036311 A1 | 2/2015 | Mullani | |
| 2015/0054979 A1* | 2/2015 | Ou | G02B 21/361 |
| | | | 348/222.1 |
| 2015/0331228 A1 | 11/2015 | Horstmeyer et al. | |

FOREIGN PATENT DOCUMENTS

| | | |
|---|---|---|
| DE | 102008035959 A1 | 3/2010 |
| DE | 102004015587 A1 | 11/2014 |
| DE | 102014101219 A1 | 8/2015 |
| DE | 102014109687 A1 | 1/2016 |
| DE | 102014112242 A1 | 3/2016 |
| DE | 102014112648 A1 | 3/2016 |
| DE | 102014113256 A1 | 3/2016 |
| DE | 102014113258 A1 | 3/2016 |
| DE | 102014113433 A1 | 3/2016 |
| DE | 102015107517 B3 | 6/2016 |
| EP | 2284592 | 2/2011 |
| EP | 3121637 A1 | 1/2017 |

OTHER PUBLICATIONS

German Search Report corresponding to German Patent Application No. 102015122712.6 dated Sep. 8, 2016. (10 pages).

International Search Report of the International Searching Authority corresponding to International Patent Application No. PCT/EP2016/082347, dated Jul. 31, 2017. (3 pages).

Written Opinion of the International Searching Authority corresponding to International Patent Application No. PCT/EP2016/082347, dated Jul. 31, 2017. (13 pages).

Pacheco et al. "Transfer function in epi-illumination Fourier ptychography" Optics Letters 40(22):5343-5346 (Nov. 15, 2015).

Dong et al. "FPscope: a field-portable high-resolution microscope using cellphone lens" Biomedical Optics Express 5(10):3305-3310 (2014).

Zheng et al. "Wide-field, high-resolution Fourier ptychographic microscopy" Nature Photonics: 1-6 (2013).

\* cited by examiner

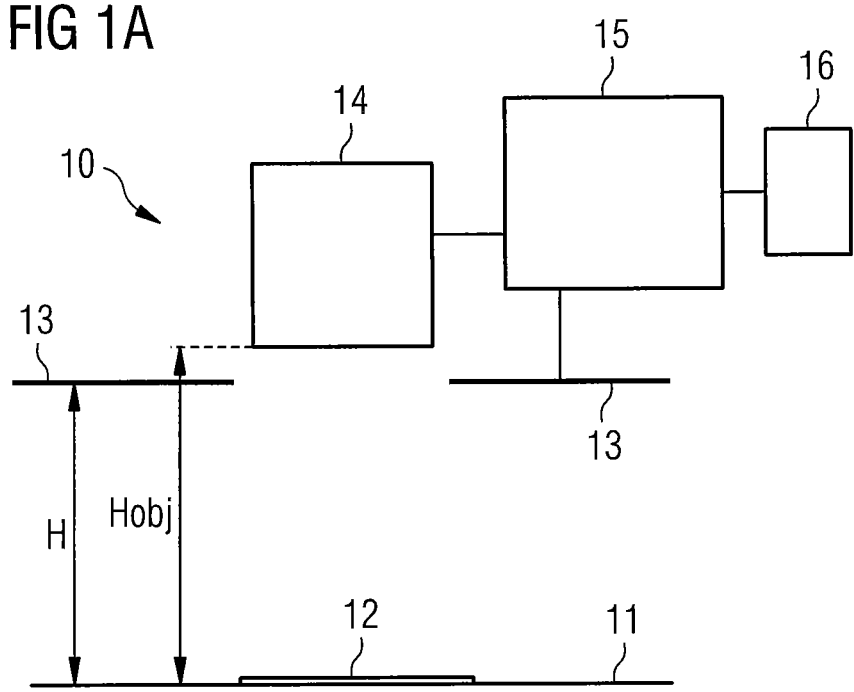
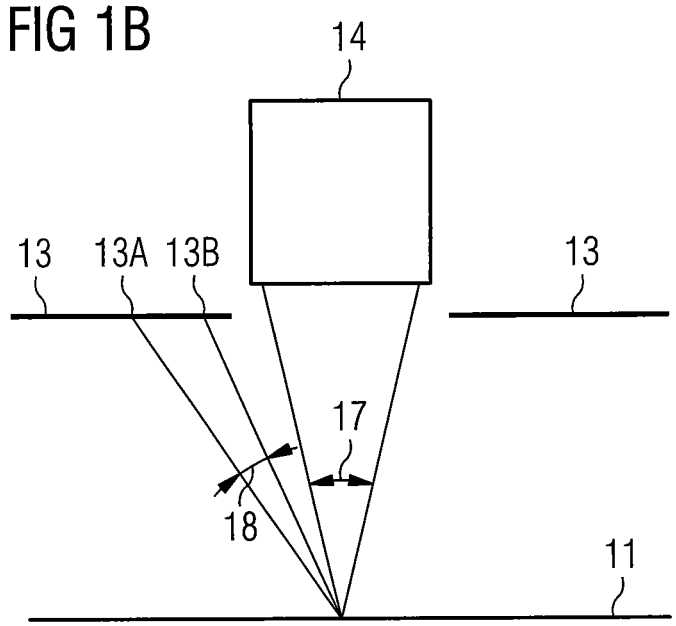

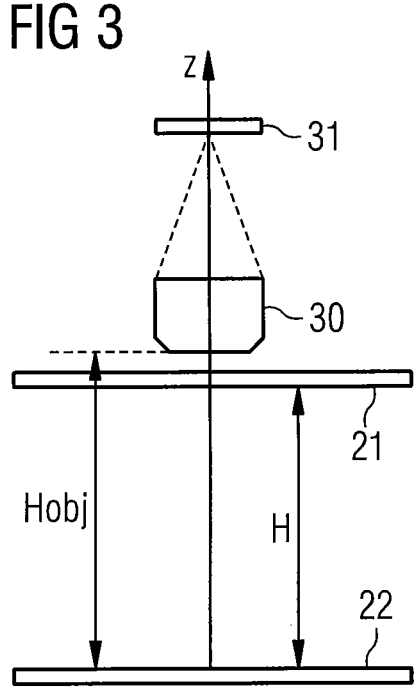
FIG 3
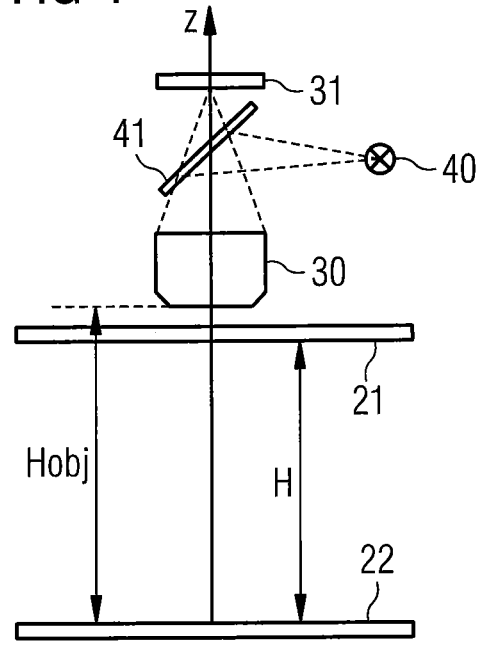
FIG 4
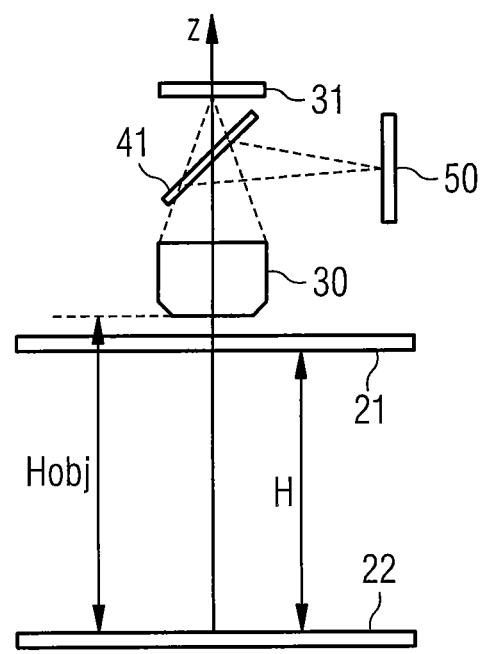
FIG 5A
FIG 5B
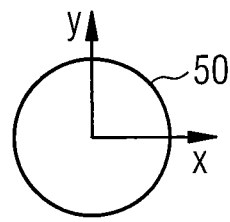

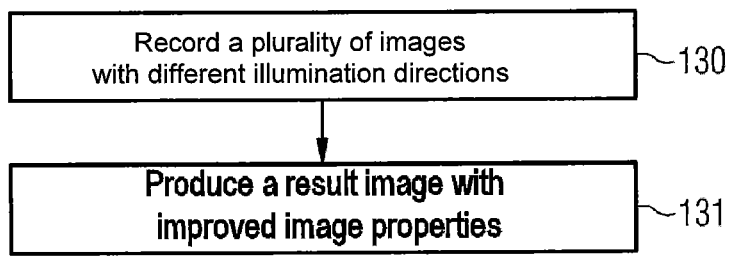
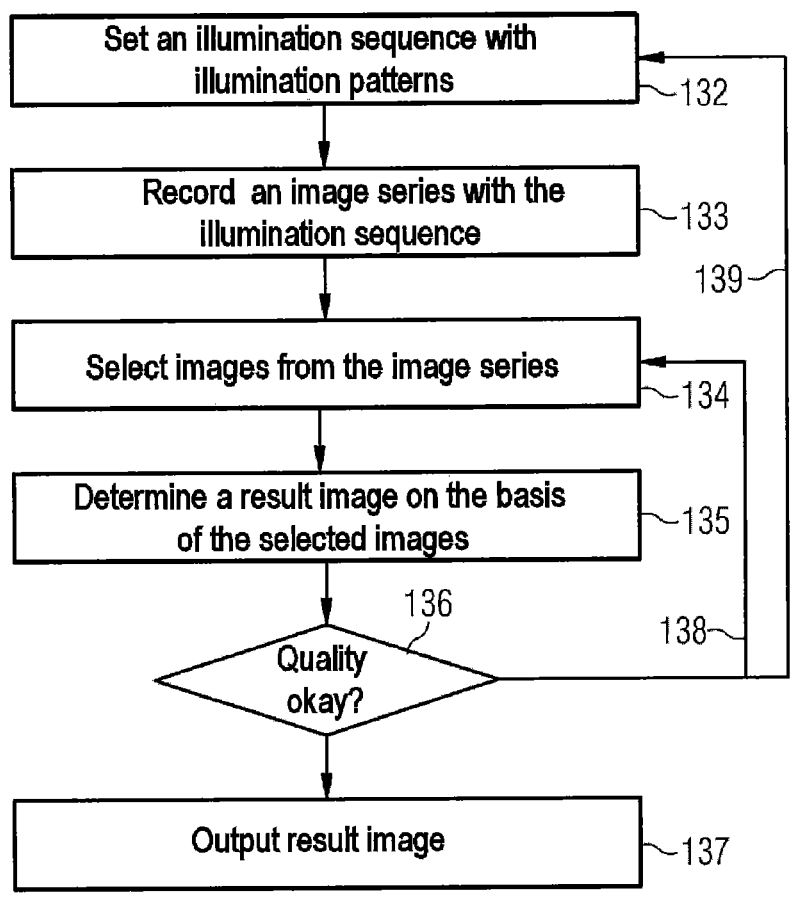

DEVICE AND METHOD FOR CAPTURING IMAGES

CROSS REFERENCE TO RELATED APPLICATIONS

This application is a 35 U.S.C. § 371 national stage application of PCT International Application No. PCT/EP2016/082347, filed on Dec. 22, 2016, which claims priority from German Patent Application No. DE 102015122712.6, filed on Dec. 23, 2015, the contents of which are incorporated herein by reference in their entireties. The above-referenced PCT International Application was published in the German language as International Publication No. WO 2017/109053 A2 on Jun. 29, 2017.

The present application relates to devices for recording images and to methods that employ a corresponding device. In particular, the present application relates to devices, e.g. microscope devices, for recording images, in which an improved result image is produced from a plurality of individual images.

An illumination is used in many cases when recording both microscopic and macroscopic images in order to illuminate an object to be recorded, e.g. a specimen. If the illumination in the process is effectuated from the same direction as which the image is recorded, too, it is possible that unwanted reflections occur in the image.

It is therefore desirable to be able to correct such reflections. Moreover, it is desirable to be able to generally increase e.g. a contrast and/or a resolution of recorded images, in particular if the latter are reduced as a result of reflections and/or by way of rays.

In principle, the practice of achieving an increased resolution by combining a plurality of images that are illuminated from different directions is known. By way of example, for the case of Fourier ptychography, this is known from Shaun Pacheco et al., "Transfer function analysis in epi-illumination Fourier ptychography", Optics Letters Vol. 40, No. 22, 2015. In the device presented therein, illumination is mirrored into a beam path of an objective via a beam splitter in order thus to obtain bright field illumination of a specimen.

Further options for obtaining an improved result image by combining a plurality of images illuminated from different directions are disclosed in DE 10 2014 113 256 and DE 10 2014 113 258 by the applicant, for example.

By way of example, an illumination device is disclosed in DE 39 06 555 A1 by the applicant.

It is an object of the present invention to provide devices and methods that, in particular, are also suitable for dark field recording.

According to a first aspect, a device for recording images is provided, comprising:
an image-recording device and
an illumination device arranged around an optical axis of the image-recording device, wherein the illumination device has a cut-out to facilitate a passage of light to the image-recording device and wherein the illumination device has a plurality of independently actuatable illumination portions; wherein the image-recording device and the illumination device are arranged on the same side of a specimen plane of the image-recording device; and
wherein an angle between adjacent illumination portions of the illumination device as seen from the specimen plane is less than or equal to an angle defined by a numerical aperture of the image-recording device.

By using such an illumination device, arranged around the optical axis of the image-recording device in such a way, with the independently actuatable illumination portions, it is possible to realize, in particular, a dark field illumination from different directions. By selecting the angles as defined above, it is possible to create an advantageous illumination from different directions, in particular for a subsequent increase in the resolution by combining individual images. It should be noted that the angle between adjacent illumination portions can vary for different illumination portions for as long as it remains less than or equal to the angle defined by the numerical aperture of the image-recording device. By way of example, the angle in the case of a constant distance between adjacent illumination portions can become smaller with increasing distance from the optical axis of the image-recording device or the distances between the illumination portions can be selected in such a way that the angle remains constant. Other types of variation are also possible.

Here, the angle between adjacent illumination portions of the illumination device can be at least 10%, at least 20%, at least 30% or at least 50% smaller than the angle defined by the numerical aperture of the image-recording device.

A ratio of the distance of the image-recording device from the specimen plane to a distance of the illumination device from the specimen plane can lie in a range between 1 and 1.5; however, it is not restricted thereto.

Thus, this allows the illumination device and the image-recording device to be arranged at a similar distance from the specimen plane and hence from the specimen.

The plurality of illumination portions can comprise a plurality of light source elements, e.g. light-emitting diodes.

By using a plurality of light source elements, it is possible to flexibly set the illumination. In particular, an illumination from different directions, at different angles and by activating a plurality of light-emitting diodes simultaneously can also be realized with different intensities.

The light source elements can be actuatable individually and/or on a segment-by-segment basis in order thus to realize the plurality of independently actuatable illumination portions. The size and form of the segments may be variable, for example by combining different numbers of light source elements to form a segment. Thus, it is possible, for example, to set the distance between the segments and the aforementioned angle between adjacent illumination portions of the illumination device in this way.

Here, different light source elements can have different properties in respect of the spectral range and/or polarization, and so it is possible to effectuate image recordings with illumination in different spectral ranges or with different polarizations.

As an alternative to individual light source elements, the illumination device can also comprise an areal light source and selectively actuatable shadowing elements for dimming a part of the areal light source in each case. Here, the areal light source can be planar, but also curved or differently shaped.

The illumination device can be ring-shaped with an internal diameter and an external diameter, wherein the internal diameter defines the cut-out. This allows illumination to be provided from different directions The device can comprise a further illumination device, wherein light from the further illumination device can be coupled into a beam path of the image-recording device. This allows the additional provision of a bright field illumination.

The further illumination device can comprise a movable light source element.

Alternatively, the further illumination device can comprise a plurality of independently actuatable illumination portions.

This also allows the provision of a bright field illumination from different directions and/or at different angles within the region allowed by the numerical aperture of the image recording device.

The illumination device and/or the further illumination device can be movable, for example in a plane parallel to the specimen plane or perpendicular thereto. The movement can also comprise tilting or a rotational movement. In some exemplary embodiments, various parts, e.g. various illumination portions, of the illumination device and/or the further illumination device can also be movable relative to one another.

The device can comprise a further image-recording device, wherein the further image-recording device differs from the image-recording device in respect of numerical aperture, working distance, magnification and/or resolution. Thus, it is possible to record images with different properties.

In respect of the image-recording device, the further image-recording device can be arranged on an opposite side of the specimen plane. Hence, it is possible to carry out both transmitted light recordings and reflected light recordings.

The device can comprise an additional illumination device, the light of which can be coupled into a beam path of the further illumination device. Thus, more variation options can be realized in respect of the illumination.

The device can further comprise a control device, wherein the control device is configured to actuate the illumination device sequentially for the purposes of activating various illumination portions in order to illuminate a specimen in the specimen plane at different angles and/or from different directions and to actuate the image-recording device in order to obtain a corresponding plurality of images for the various actuations of the illumination device.

By way of the illumination from different directions, it is possible, in particular, to correct reflections that arise by virtue of the illumination being arranged on the same side as the image-recording device.

The control device can be further configured to combine a plurality of images to form a result image.

One or more of the following can be carried out when combining by way of the control device:
  a reflection correction,
  an improvement in the resolution,
  an improvement in the contrast,
  a determination of a z-map of the specimen,
  a determination of a phase contrast image,
  an improvement in the depth-of-field range.

Thus, it is possible to produce images with improved properties.

The control device can be further configured to evaluate the quality of the result image and, depending on the evaluation, to modify the sequential actuation of the illumination device and/or a selection of images to be combined. Thus, it is possible to dynamically adapt settings depending on a result obtained when combining and optionally a desired result.

According to a second aspect, a method for recording images is provided, comprising:
recording a plurality of images using the device as described above, wherein different illumination portions of the illumination device of the device are activated for the various images of the plurality of images, and
combining the plurality of images to form a result image with improved image properties.

According to a third aspect, a method for recording images is provided, comprising:
  recording a plurality of images with different illumination directions,
  selecting images to be combined from the plurality of images,
  determining blooming image components in the images to be combined, and
  combining the images to be combined to form a result image with reduced reflections,
wherein at least some of the blooming image components are omitted in the images to be combined when combining.

The method according to may furthermore comprise:
  determining whether the blooming image components have the same position in the images to be combined,
  wherein the image components that do not have the same position in the images to be combined are omitted when combining the images to be combined.

The method may furthermore comprise:
  selecting further images to be combined from the plurality of images, wherein the further images to be combined are different from the images to be combined, and
  combining the further images to be combined such that these have an increased image contrast.

Recording the further images to be combined from the plurality of images can be triggered by selecting the further images to be combined.

The method may furthermore comprise:
  carrying out an optimization for providing combination parameters for combining the further images to be combined, wherein the combination parameters ensure that the result image satisfies the increased image contrast as an optimization criterion.

Here, different illumination portions of the illumination device can be activated for the various images of the plurality of images with different illumination directions.

Below, the invention will still be explained in detail by way of exemplary embodiments, with reference being made to the attached drawings. In the figures:

FIG. 1A shows a block diagram of a device according to one exemplary embodiment, FIG. 1B shows a diagram for elucidating an arrangement of illumination portions in the exemplary embodiment of FIG. 1A, FIG. 2A shows a schematic cross-sectional view of a device according to one exemplary embodiment, FIG. 2B shows a plan view of an illumination device of the device of FIG. 2A, FIG. 3 shows a cross-sectional view of a device according to a further exemplary embodiment, FIG. 4 shows a cross-sectional view of a device according to a further exemplary embodiment, FIG. 5A shows a cross-sectional view of a device according to a further exemplary embodiment, FIG. 5B shows a schematic view of an illumination device of the exemplary embodiment of FIG. 5A, FIGS. 6A and 6B show schematic views of an illumination device according to an exemplary embodiment, FIGS. 7A to 7C show illustrations for elucidating a possible actuation of the illumination device of FIGS. 6A and 6B, FIG. 8 shows a schematic cross-sectional view of a device according to a further exemplary embodiment, FIG. 9 shows a schematic cross-sectional view of a device according to a further exemplary embodiment, FIGS. 10 to 12 show detailed views of various implementation examples, FIGS. 13A and 13B show flowcharts for elucidating methods according to some exemplary embodiments, and FIGS. 14 to 21 show exemplary images for elucidating the effect of different exemplary embodiments.

Various exemplary embodiments of the invention are explained in detail below. These exemplary embodiments should not be construed as restrictive but only serve for elucidation purposes. In particular, a description of an exemplary embodiment with a plurality of features or elements should not be interpreted to the effect that all these features are necessary for implementing exemplary embodiments. Rather, other exemplary embodiments may have fewer features than illustrated and/or alternative features. Moreover, further features and elements can be present in addition to the illustrated and presented features and elements, for example elements used in conventional devices for recording images.

Features or elements of different exemplary embodiments can be combined with one another, unless indicated otherwise. Variations and modifications, which are described for one of the exemplary embodiments, may also be applicable to other exemplary embodiments, provided nothing else is specified.

FIG. 1A illustrates a block diagram of a device according to one exemplary embodiment. In the exemplary embodiment of FIG. 1A, an image-recording device 14 serves to record an image of a specimen 12 that is arranged in a specimen plane 11. Here, the image-recording device 14 of the device 10 can comprise a microscope objective with an image sensor coupled thereto; however, additionally or alternatively, it can also comprise a camera device for manufacturing macroscopic overview images. Thus, the application of the invention is not restricted to macroscopic images or microscopic images but can be applied to both types of images.

A distance between the image-recording device 14 and the specimen plane 11 is denoted by Hobj. By way of example, this distance can be measured from the specimen plane 11 to a lens of the image-recording device 14 lying closest to the specimen or to any other suitable part of the image-recording device 14.

Moreover, the device 10 of FIG. 1A has an illumination device 13. The illumination device 13 can comprise a plurality of light source elements, for example light-emitting diodes, which are actuatable individually and/or in groups (also referred to as segments), said light source elements being arranged substantially concentrically around the image-recording device 14. In one exemplary embodiment, the light source elements are arranged symmetrically in relation to an optical axis of the image-recording device 14 such that each light source element has an assigned complementary light source element that lies on an imaginary line that passes through the light source element, the light source element complementary thereto and the optical axis, wherein the light source element and the complementary light source element have the same distance from the optical axis.

Instead of individual light source elements, the illumination device 13 can also have an areal light source and actuatable shadowing elements in order to selectively dim individual parts of the areal light source. As a result of this, it is possible to achieve substantially the same actuatability as by individual light source elements.

Here, as illustrated in FIG. 1A, the illumination device 13 can have an aperture to facilitate a passage of light from the specimen 12 and hence to facilitate the recording of an image of the specimen 12 by the image-recording device 14. Here, a distance of the illumination device 13 from the specimen plane 11 is denoted by H in FIG. 1. It is clear from FIG. 1 that the image-recording device 14 and the illumination device 13 are arranged on the same side of the specimen plane 11, and so the illumination is effectuated in reflection (in contrast to transmitted light illumination). Here, a ratio of Hobj to H can lie in the range of 1 to 1.5; however, it is not restricted thereto.

In the exemplary embodiments, the distances between individually actuatable adjacent illumination portions, e.g. individual light source elements, shadowing elements or groups thereof, are selected to fit to the numerical aperture of the image-recording device 14 in this case. This is explained with reference to FIG. 1B, which shows a portion of FIG. 1A.

In FIGS. 1B, 13A and 13B denote two adjacent illumination portions of the illumination device 13, wherein this should only be considered to be an example. An angle between these illumination portions as seen from a point in the specimen plane 11 is denoted by 18. An angle of this point in the specimen plane that is assigned to the numerical aperture of the image-recording device 14 is denoted by 17. In exemplary embodiments, the illumination portions are arranged and/or selected in such a way that the angle 17 is less than or equal to the angle 18, preferably 10% less, 20% less, 30% less or 50% less. This has advantages when combining images to increase the resolution, as described below. It should be noted that the angle 18 for different illumination portions 13A, 13B can vary for as long as it remains less than or equal to the angle 17 defined by the numerical aperture of the image-recording device. By way of example, the angle in the case of a constant distance between adjacent illumination portions 13A, 13B can become smaller with increasing distance from the optical axis of the image-recording device 14 or the distances between the illumination portions 13A, 13B can be selected in such a way that the angle remains constant. Other types of variation are also possible.

In the exemplary embodiment of FIG. 1, the illumination device 13 is controlled by a control device 15. By way of example, the control device 15 can be implemented as an appropriately programmed computer or as an appropriately programmed microcontroller. However, other implementations in software, firmware, hardware or combinations thereof are also possible.

Moreover, the control device 15 controls the image-recording device 14 and receives images from the latter.

For image recording purposes, the control device 15 can actuate the illumination device 13 in such a way, in particular, that the specimen 12 is sequentially illuminated by different segments of the illumination device 13. Consequently, the specimen 12 is illuminated successively from different directions and/or at different angles. An image is recorded by the image-recording device 14 for each of these illumination directions and/or illumination angles. The control device 15 combines these images to form a result image which has improved properties in comparison with the individual images, for example in respect of sharpness, contrast or reflections. By way of a suitable combination of the images, it is possible to at least largely remove reflections from the result image by calculation, said reflections arising from the illumination of the illumination device 13 (i.e., by virtue of the illumination being effectuated from the same side of the specimen as the image recording), and so this can improve the image quality. Examples to this end will still be explained in more detail below. The result image and/or the individual images can be presented on a display 16 and/or can be stored for later use.

Detailed exemplary embodiments of such devices 10 are now explained in more detail with reference to FIGS. 2 to 5. In these figures, a representation of a control device and a display, such as a control device 15 and the display 16 of FIG. 1, has been omitted. However, such components can also be provided in the exemplary embodiments of FIGS. 2 to 5. In this respect, the exemplary embodiments of FIGS. 2 to 5 concentrate on an image-recording device and, in particular, on an employed illumination device.

In the exemplary embodiment of FIG. 2A, a camera unit 20 is provided for recording an image of a specimen, wherein the specimen should be arranged in a specimen plane 22. A distance of the camera unit 20 from the specimen plane 22 is denoted by Hobj, like in FIG. 1. The camera unit 20 of FIG. 2 comprises an optical unit and an image sensor. Moreover, an illumination device 21 is provided in order to be able to illuminate a specimen in the specimen plane 22 from different directions and/or at different angles. A distance of the illumination device 21 from the specimen plane 22 is denoted by H. Like in FIG. 1, the camera unit 20 of an image-recording device and the illumination device 21 are thus arranged on the same side of the specimen plane 22. Here, like in FIG. 1, a ratio of Hobj to H can lie in the range of 1.5 to 1; however, it is not restricted thereto.

FIG. 2B shows a plan view of the illumination device 21 in an xy-plane parallel to the specimen plane 22. In the exemplary embodiment of FIG. 2B, the illumination device 21 is disk-shaped with a central cut-out, which has a radius Rin. The radius of the disk is Rout. A plurality of individual light source elements, for example light-emitting diodes, can be arranged in the region of the disk. However, an areal illumination, for example an areal OLED illumination, with individual switchable pixels or any other type of illumination, in which segments or parts can be selectively activated or deactivated, is possible. A radius to a certain point of the illumination device, for example to a position of a light source element, is denoted by r. Here, Rin≤r≤Rout applies. Here, the external radius Rout determines a maximum illumination angle as measured to the perpendicular (z-axis in FIG. 2A). The larger Rout, the larger an employed illumination angle can be. The internal diameter Rin depends on the front dimensions of the objective 20, the distance between the camera unit 20 and the illumination device 21 and an angle at which the camera unit 20 observes a specimen arranged in the specimen plane 22.

More specific examples for the illumination device 21 will still be explained in more detail below with reference to FIGS. 6 and 7. Consequently, the illumination device 21 can also serve for dark-field illumination since direct reflections (with angle of incidence=angle of reflection) do not reach the camera unit 20.

The form of the illumination device 21 in FIG. 2B should be understood as being exemplary and it is also possible to use other forms, for example square, rectangular, ellipsoid, star-shaped or other basic forms, over which the individual light source elements are distributed or which contain individual switchable segments. By selectively activating and deactivating light source elements or segments of the illumination, it is possible to realize an illumination from different directions, at different angles and/or with different intensities (e.g., by activating different numbers of light source elements). A plurality of apertures or cut-outs are possible if a plurality of objectives or a plurality of other image-recording devices are used in an arrangement. The form of the cut-out can also vary and it can be adapted, for example, to the form and dimensions of an employed objective or an employed other image-recording device. A non-planar arrangement of light source elements is also possible.

FIGS. 3 to 5 show developments of the device of FIG. 2. In order to avoid repetition, the same elements are denoted by the same reference signs and not explained repeatedly.

Variations and developments that were discussed with reference to FIGS. 1 and 2 are also applicable to FIGS. 3 to 5.

In FIG. 3, an objective 30 and an image sensor 31 are presented instead of the camera unit 20 for the purposes of recording images. By way of example, the objective 30 can be a microscope objective for recording microscopic images or else a conventional objective for recording macroscopic overview images. Otherwise, the exemplary embodiment of FIG. 3 corresponds to the exemplary embodiment of FIG. 2A.

In the exemplary embodiment of FIG. 4, a further illumination device 40 is provided in addition to the illumination device 21 that, as described, can produce an illumination for dark field measurements. Light from the illumination device 40 is mirrored into the objective 30 by means of a beam splitter 41 and it can consequently serve as a coaxial bright field illumination of a specimen. In the exemplary embodiment of FIG. 4, the illumination device 40 is realized by a single light source in the process, said single light source e.g. being movable in order to realize a bright field illumination from different directions. It is also possible to use a plurality of individual light sources, which are individually switchable.

A further exemplary embodiment with a further illumination device 50 is illustrated in FIG. 5A. FIG. 5B shows a plan view on the further illumination device 50. In the case of FIG. 5B, it is implemented in a substantially disk-shaped manner, wherein a plurality of individual discrete light source elements, for example light-emitting diodes, can be distributed over the disk. In other exemplary embodiments, the further illumination device 50 can be a display with individual switchable light points, for example an OLED display. By the selective activation of different light sources, it is once again possible to produce a bright field illumination from different directions. Light from the further illumination device 50 is mirrored into the objective 30 via the beam splitter 30, like in FIG. 4. Individual light source elements of the further illumination device 50 can have any sequence or arrangement relative to one another and can also have different dimensions or illuminate different solid angles. Individual light source elements can be arranged in rectangular or circular grids, with uniform or varying distances of groups of light source elements or individual light source elements from one another and/or from a center point of the illumination device 50. The further illumination device 50 can be planar or a combination of planar elements, or else it can have a spherical or aspherical form, on which the light source elements are arranged. The dimensions of the light source elements of the further illumination device 50 can be selected such that they fill, do not quite fill or project beyond a rear-side focal plane of the optical unit 30. The individual light source elements of the further illumination device 50 can be activated and deactivated all at the same time or individually or in groups, depending on the requirements for a certain measurement such as a bright field measurement, for improving the contrast or for obtaining a z-information item regarding the specimen.

The further illumination device 40, 50 of FIGS. 4 and 5 can be actuated independently of the illumination device 21, for example for different measurements, or it can be actuated together with the latter in order to realize a combined bright and dark field illumination. This may be advantageous for the improvement in contrast, increase in resolution and/or increase of the depth-of-field range described below.

By way of example, the bright field illumination can be effectuated using the further illumination device 40 or 50, by means of which illumination angles that are complementary to the illumination device 21 are realized, under which angles additional images can be recorded for a subsequent improvement in the resolution. In some exemplary embodiments, as mentioned previously, the illumination device 40 is movable or the illumination device 50 is actuatable in different segments in order to realize different illumination angles through the objective 30.

The illumination device 21 and/or the further illumination device 40 or 50 can have light source elements in the same spectral range or different combinations of individual light source elements with different spectral properties. By virtue of these light source elements being individually actuatable, it is then also possible to selectively modify the spectral composition of the illumination in such a case. In some exemplary embodiments, different light source elements can have different polarizations of the emitted light and/or different divergences of the emitted light rays in order thus to be able to vary the illumination according to requirements.

The illumination device 21 and/or the further illumination device 40, 50 can be movable, for example in a plane parallel to the specimen plane or perpendicular thereto. The movement can also comprise tilting or a rotational movement. In some exemplary embodiments, various parts, e.g. various illumination portions, of the illumination device 21 and/or the further illumination device 40, 50 can also be movable relative to one another.

Next, examples for illumination devices, in particular for an illumination device like the illumination device 21 illustrated in FIG. 2A with a ring-shaped arrangement of the light source elements, are explained in more detail with reference to FIGS. 6 and 7.

FIG. 6A shows an illumination device 60, in which a plurality of light-emitting diodes 61 are arranged in a ring shape, as already discussed with reference to FIG. 2B. In the illumination device 60, the individual light-emitting diodes 61 are arranged in this case with a uniform distance dx in the x-direction and a uniform distance dy in the y-direction. dx can equal or not equal dy. A total of 631 light-emitting diodes are provided in the illustrated exemplary embodiment, wherein other numbers of light-emitting diodes can also be used in other exemplary embodiments. In particular, the light-emitting diodes can be white light light-emitting diodes; however, they can also comprise colored light-emitting diodes (for example red, green and/or blue light-emitting diodes). By way of example, dx and dy can be selected approximately in the range of 2-2.5 mm. By way of example, the distance between the light-emitting diodes can be selected fitting to a numerical aperture of an image-recording device, for example of the objective 30 in FIGS. 3 to 5 or of the camera unit 20 in FIG. 2A, as explained above with reference to FIG. 1B. By way of example, the aforementioned value of 2.5 mm can fit to a comparatively small numerical aperture in the region of 0.005, for example in the case of an overview camera. A greater distance can be selected between the light-emitting diodes in the case of larger numerical apertures or else it is possible to use only some of the light-emitting diodes 61. It is also possible to use other light source elements instead of light-emitting diodes.

Segments of light-emitting diodes 61 can be activated or deactivated together for some measurements. As an example, FIG. 6B illustrates eight segments 62, which are numbered from 1 to 8. The light-emitting diodes of each segment can be activated and deactivated together for some measurements. In the illustrated example, segments 2, 4, 5 and 7 can each comprise 10×10 light-emitting diodes, segments 1, 3 and 6 can each comprise 58 light-emitting diodes and the segment 8 can comprise 57 light-emitting diodes. However, these numerical values only serve as an example and, depending on the configuration of the illumination device, it is also possible to use a different division into segments with different numbers of light source elements, which can also be adapted dynamically. This will be described below with reference to FIG. 13B.

In order to be able to implement a result image with an improved contrast or a calculation of contrast in a microscope image, a plurality of images are recorded in succession in the exemplary embodiments, wherein a different one of the segments 62 is active for each image. Then, these images can be combined, for example in order to obtain a result image with an increased contrast, or be evaluated in order to determine a contrast. The division into segments in FIG. 6B likewise only serves as an example, and it is also possible to use a different division, for example with a different number of segments.

In other cases, it is also possible to switch smaller segments or individual light-emitting diodes in order, for example, to realize an illumination from different directions at a plurality of different angles. An example is shown in FIGS. 7A to 7C, in which the light-emitting diodes are activated sequentially according to the arrangement in rows, as is indicated by arrows. Thus, a light-emitting diode 70A is activated in FIG. 7A, a light-emitting diode 70B is activated in FIG. 7B, which shows a later time, and a light-emitting diode 70C is activated at an even later time, which is shown in FIG. 7C. Instead of the sequential activation according to the rows, there can also be a sequential activation according to columns or else a random sequential activation of the light-emitting diodes.

Such an illumination with individual light source elements, which are activated and deactivated, can serve, for example, for improving the resolution or for determining a height profile of the specimen (i.e., z-information) for the purposes of autofocus setting, refocusing an objective or for increasing the depth of field. Here too, it is possible to record a plurality of images that are illuminated from different angles and/or from different directions, and a corresponding result image can be produced by combining the images. In this respect, too, details will still be explained in more detail below.

By switching on various light source elements, it is possible to realize illuminations from different directions and angles, as already explained above. Here, each light-emitting diode defines a specific angle and a specific position. The table presented below shows examples for the first 10 light-emitting diodes of the light-emitting diode arrangement 61, i.e. the light-emitting diodes of the uppermost row. Here, r denotes the radius, as plotted in FIG. 2B, and H denotes the distance between the illumination device and specimen plane, as likewise plotted in FIGS. 1 to 5. Further, theta denotes the illumination angle and R denotes the distance of the light source from a point of intersection of the optical axis of the system with the specimen plane. The illumination angle theta defines the numerical aperture of the illumination, which is denoted by NA.illum in the table.

| Illumination Light-emitting diode # | r mm | H mm | R mm | theta | sin (theta) NA.illum |
|---|---|---|---|---|---|
| 1 | 38.0 | 190 | 193.8 | 11.30 | 0.196 |
| 2 | 37.3 | | 193.6 | 11.10 | 0.193 |
| 3 | 36.8 | | 193.5 | 10.96 | 0.190 |
| 4 | 36.4 | | 193.5 | 10.86 | 0.188 |
| 5 | 36.3 | | 193.4 | 10.81 | 0.188 |
| 6 | 36.3 | | 193.4 | 10.81 | 0.188 |
| 7 | 36.4 | | 193.5 | 10.86 | 0.188 |
| 8 | 36.8 | | 193.5 | 10.96 | 0.190 |
| 9 | 37.3 | | 193.6 | 11.10 | 0.193 |
| 10 | 38.0 | | 193.8 | 11.30 | 0.196 |

The devices discussed above, in which an illumination is effectuated from the same side of a specimen as an image recording, can be combined with one or more further image-recording devices, in which the specimen is recorded from the respective other side. Examples therefor will now be described with reference to FIGS. 8 and 9. Here, FIG. 8 is based on the exemplary embodiment of FIG. 5A and FIG. 9 is based on the exemplary embodiment of FIG. 3. In a corresponding fashion, additional image-recording devices can also be provided in the exemplary embodiments of the FIG. 1, 2 or 4. Elements of FIGS. 8 and 9 that correspond to elements in the exemplary embodiments of FIGS. 3 and 5A that have already been discussed above are denoted by the same reference signs and are not explained again in detail. In FIGS. 8 and 9, Hobj1 denotes the distance between the specimen plane 22 and the objective 30 and consequently corresponds to the distance Hobj of FIGS. 1 to 5.

In the exemplary embodiment of FIG. 8, a further objective 80 with a further image sensor (not illustrated here) is provided in addition to the objective 30, with the further objective 80 being arranged on an opposite side to the objective 30 in relation to the specimen plane 22. Here, for example, the objective 30 can have a relatively low numerical aperture and can serve to record overview recordings. By means of the illumination device 21 and/or the further illumination device 50, it is possible to realize illuminations from various directions, as described above, and it is then possible to calculate a result image on the basis of a plurality of recorded images, a contrast being improved and/or reflections by the illumination being corrected in said result image. The objective 80 can have a higher numerical aperture and can likewise record a plurality of images, wherein, in principle, the illumination devices 21 and 50 can serve for illumination purposes. In this case, transmitted light images are recorded by the further objective 80. In other exemplary embodiments, the further objective 80 can have a dedicated illumination device (not illustrated in FIG. 8).

The objective 30 and the objective 80 differ from one another in respect of the working distance, the magnification, the numerical aperture and/or the resolution, and so images with different image properties can be obtained. By means of the additional objective 80, it is then possible, in particular, to obtain transmitted light images of transparent or semi-transparent specimens, while reflected light images, optionally with bright field illumination or dark field illumination, can be obtained by means of the objective 30. Illuminations at different angles can be obtained in both cases.

FIG. 9 shows an alternative to the exemplary embodiment of FIG. 8, in which the further illumination device 50 and the beam splitter 41 are omitted at the objective 30 and, in exchange, an additional illumination device 91 and a beam splitter 90 are provided at the further objective 80. By means of the additional illumination device 91, which, in principle, can have the same configuration as the further illumination device 50, a transmitted light illumination in the bright field for the objective 30 and/or a reflected light bright field illumination for the objective 80 are possible. The illumination by the further illumination device 91 can provide, in particular, an illumination for a comparatively small image portion of the objective 30. The range of employable angles for the illumination by the further objective 80, i.e. by means of the further illumination device 91, is defined by the numerical aperture of the objective 80. The component of the field of vision of the objective 30 that can be illuminated thus can be increased by lateral displacement of the specimen plane or of the illumination device 91 or of the objective 80.

Further exemplary embodiments will now be described with reference to FIGS. 10 to 12. FIG. 10A shows a microscope device 100 according to an exemplary embodiment and FIG. 10B shows a detailed view of the microscope device 100 of FIG. 10A. In FIG. 10, an objective 103 is provided with an illumination device 101, which is configured as explained with reference to FIGS. 6 and 7 for the illumination device 60. Here, different segments or light-emitting diodes can be selectively activated in the illumination device 101. By way of example, the objective 103 can have a comparatively low numerical aperture and can serve to record overview images. Then, a further objective 102 with a higher numerical aperture can serve to record detailed images. Here, in the exemplary embodiment of FIG. 10, the objective 102 is provided with discrete light source elements 104, for example light-emitting diodes, which are arranged concentrically in a ring about the objective 102. An illumination from different directions can also be realized by the light-source elements 104.

Then, during operation, a sequence of overview images can be recorded with the objective 103, wherein the illumination device 101 is actuated for illumination from different directions and/or different angles. By combining these images, it is then possible to provide, for example, a reflection-free overview image with a comparatively low resolution, a reflection-free overview image with an improved contrast, a reflection-free overview image with an improved resolution by combining the images or a reflection-free overview image with an improved resolution and an improved contrast. Parallel or sequentially therewith, the objective 102 can create detailed recordings, wherein, in this case, the illumination can likewise be varied by activating different light source elements 104 and, subsequently, a contrast and/or a resolution can be improved and/or reflections can be corrected by combining the individual images. The individual steps, i.e., in particular, the individual image recordings, can then be optimized for a respective task depending on the requirements in respect of speed, image quality and capability.

FIG. 11 shows various microscope objectives 112, 113, 114 that can be combined with an illumination device 111, which can be configured in a manner corresponding to the illumination device 61 of FIGS. 6 and 7. These objectives 112, 113 and 114 can be used with a microscope 110. By way of example, the objective 112 can be a 5× objective, the objective 113 can be a 1.6× objective and the objective 114 can be a 0.5× objective. In particular, the illumination device 111 can be matched to the front lens diameter of the 0.5× objective; however, it can also be used on other objectives. It is also possible to provide different illumination devices for different objectives, for example with different internal and external diameters as shown in FIG. 2A.

FIGS. 12A to 12C present a further combination of a corresponding illumination device 120, which can once again be configured like the illumination device 61 of the FIGS. 6 and 7, with an objective 121 for installation in a microscope 122. Hence, illumination devices according to the invention can be used with different objectives and microscope systems.

As already explained above, an image improvement can be obtained by recording the plurality of images with different illumination devices and/or different illumination angles. This is explained below with reference to FIGS. 13 to 20.

FIG. 13A shows a flowchart of a corresponding method, which can be carried out with the aid of the devices of FIGS. 1 to 12. In particular, a control and calculation for the method of FIG. 13A can be effectuated in the control device 15 of FIG. 1.

In a step 130 of the method of FIG. 13A, a plurality of images is recorded with different illumination directions and/or different illumination angles. To this end, it is possible, for example, to activate the various light source elements or groups/segments of light source elements of the illumination device in sequence, as already explained above, and to in each case record one or more images for each illumination. In step 131, a result image with improved image properties is produced from the plurality of images. In particular, it is possible to remove reflections, it is possible to improve a contrast, it is possible to create a z-map of the image, i.e. a height profile, and/or it is possible to improve the resolution.

In the process, it is possible to determine which image parts are "blooming" in each case, i.e. in which image parts e.g. pure white is present (or all color channels, e.g. red, green, blue, are on the highest value in the case of color images), for the purposes of removing reflections. It is possible to determine that these are reflections if these regions do not have the same position in different images. Then, when combining the plurality of images for producing the result image, it is possible to use a combination of the plurality of images, for example by averaging, wherein, for example, the blooming regions identified above are respectively ignored (omitted) such that, if a certain blooming region is present in one of the images, only the remaining images are used for this region.

It is also possible to undertake a reflection correction as described in detail in the German patent application DE 10 2014 113 256 by the applicant. Here too, a plurality of images are recorded for different illumination geometries, and a shadowing operation is applied to some of the images for the purposes of a reflection suppression, said shadowing operation depending on the illumination geometry, i.e. on the illumination direction and illumination angle, employed when recording the respective image. The modified images produced thus can be combined to form a result image.

By way of example, z-positions in the image can be determined as described in the German patent application DE 10 2014 109 687 or in the German patent application DE 10 2014 113 433. Here, the illumination can be brought about from a plurality of different illumination directions, in particular in defocused fashion. In this case, the position of the imaged objects depending on the illumination direction changes as a function of their z-position. Then, a z-map can be created from the displacements of the objects as a function of the illumination direction. This z-map can then be applied for the purposes of further image improvements, for example for those explained below.

By way of example, an improvement of resolution, sharpness and contrast can be undertaken as described in DE 10 2014 113 258. In the process, intensity images are recorded with different illumination geometries, with different illumination directions and/or illumination angles in the present case, and combined to produce a result image.

Moreover, it is possible to apply a distortion as described in DE 10 2014 112 648. Additionally, it is possible to increase the depth of field, as described in DE 10 2015 107 517, and/or it is possible to produce a phase contrast image, as explained in DE 10 2014 112 242. The aforementioned methods can be applied individually, or else in combination with one another.

The method can be adapted dynamically, as will now be described with reference to FIG. 13B. FIG. 13B shows a flowchart of a further method, which constitutes an extension to the method of FIG. 13A and which can likewise be implemented in the control device 15 of FIG. 1.

In a step 132, an illumination sequence with illumination patterns is set, i.e., the sequence in which illumination portions (individual light source elements or else segments, as described above) are activated is set. This can be carried out depending on an object of the method (e.g. increasing resolution, correcting reflections, etc., as described above). Then, in step 133, a series of images is recorded according to the illumination sequence.

Then, images from the image series are selected for subsequent combination in a step 134. This could be all the images of the image series, but also only a few images. Once again, this may be effectuated depending on the object of the method.

Then, a result image is determined in a step 135 on the basis of the images selected in step 134. This can be carried out with application of the methods described above with reference to FIG. 13A.

In a step 136, an evaluation is carried out as to whether the quality of the result image is satisfactory (e.g. sufficient images sharpness, reflection sufficiently corrected, etc.). Should this be the case, the result image is output in a step 137. Otherwise, there are two options, which can also be combined:

Corresponding to an arrow 138, there can be a return to step 134, with the image selection being modified. By way of example, some images can be omitted.

Corresponding to an arrow 139, there can be a return to step 132, with the illumination sequence being modified. By way of example, it is possible to modify the dimensions and distance of the employed segments by activating or deactivating light source elements at the edge of the segments, which modifies the angle 18 in FIG. 1B.

In this way, it is possible to dynamically adapt the illumination sequence and/or the image selection to the requirements.

Below, the mode of operation of such image improvements is explained using exemplary images on the basis of FIGS. 14 to 20.

FIG. 14 shows an exemplary image, which was not corrected and in which, for example, all light-emitting diodes of an illumination device, such as the illumination device 61 of FIGS. 6 and 7, are activated. A clear spot reflection is visible in FIG. 14 at a central element 140 of the example image. Moreover, ring-shaped reflections occur in the element 141 (a glass hemisphere) arranged top left.

FIGS. 15 to 17 show various image series that were recorded of the arrangement illustrated in FIG. 14, with the illumination varying from image to image in each of FIGS. 15 to 17. FIGS. 15A and 15B show two images for two different illuminations. By way of example, half of the light source elements can be activated in each case here. By way of example, it is possible to see that the reflection in the central element 140 then occurs at different locations, and the reflection in element 141 changes, too.

FIGS. 16A to 16B show recordings for four different illuminations, for example in which a quarter of the light-emitting diodes of the illumination device 61 of FIGS. 6 and 7 are activated in each case. It is possible to see that, for example, no reflection at all occurs at the central element 140 in FIGS. 16B and 16C.

Finally, FIGS. 17A to 17H show recordings with eight different illuminations, in which, for example, the eight segments illustrated in FIG. 6B were activated in succession. Here too, the reflection changes from image to image.

Consequently, it is possible to suppress the reflections by combining the images as described above. FIG. 18 shows an image which was obtained by combining a plurality of images with different illuminations and in which a reflection correction has been carried out. It is clear that no reflections are visible any more at elements 140 and 141 and the elements are clearly identifiable. An image as in FIG. 18 can be substantially obtained from each of the image sets of FIGS. 15 to 17.

Figure 2A:
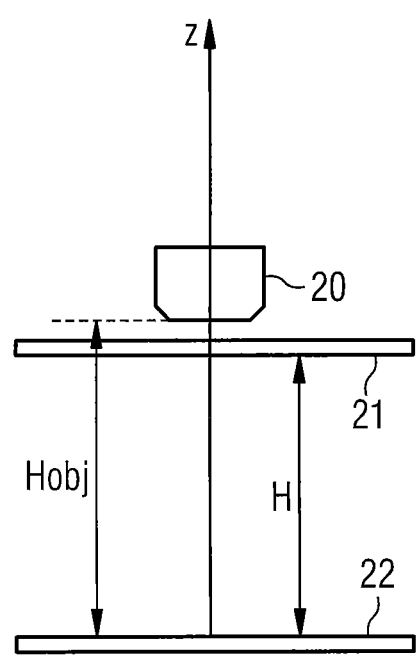
Figure 2B:
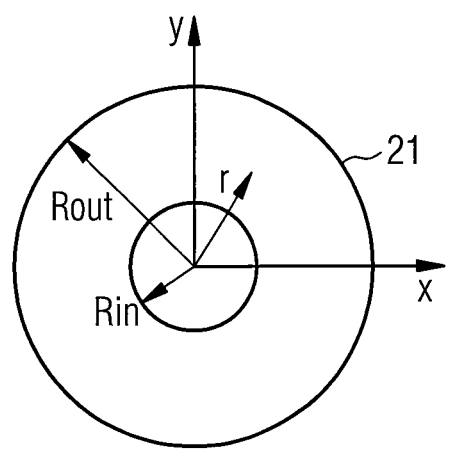
Figure 6A:
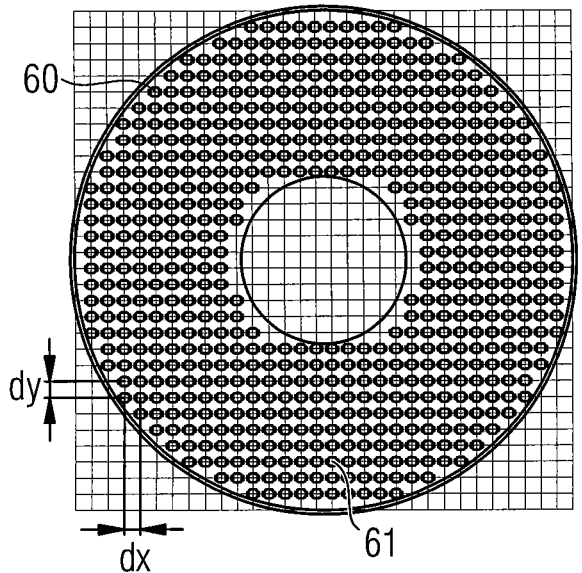
Figure 6B:
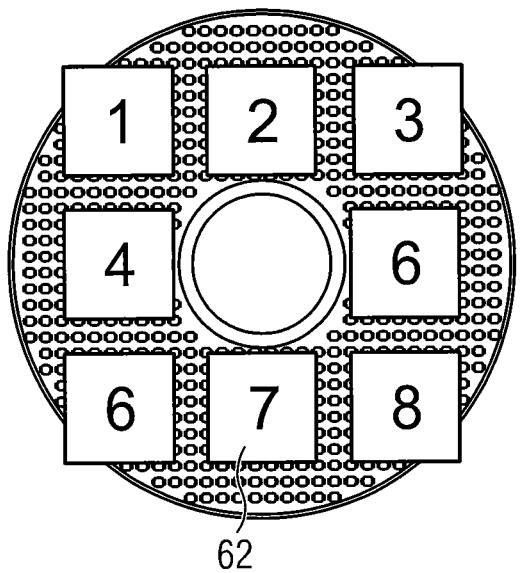
Figure 7A:
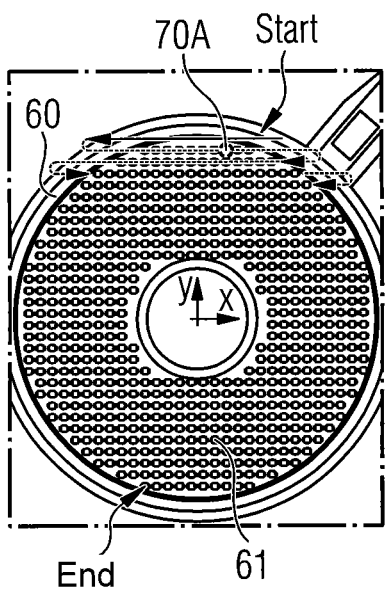
Figure 7B:
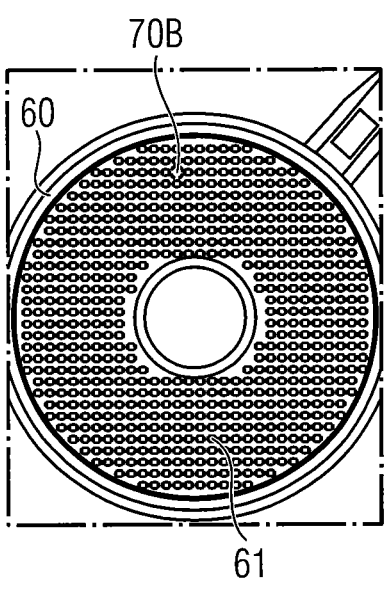
Figure 7C:
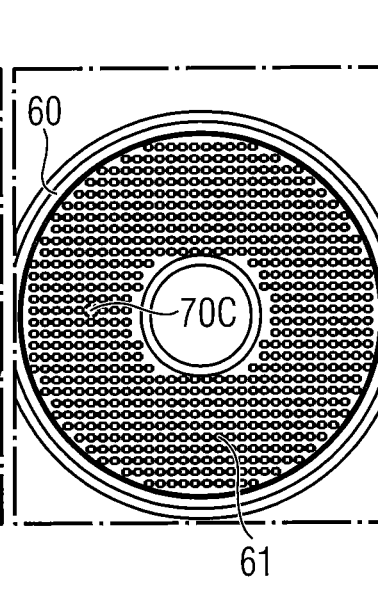
Figure 8:
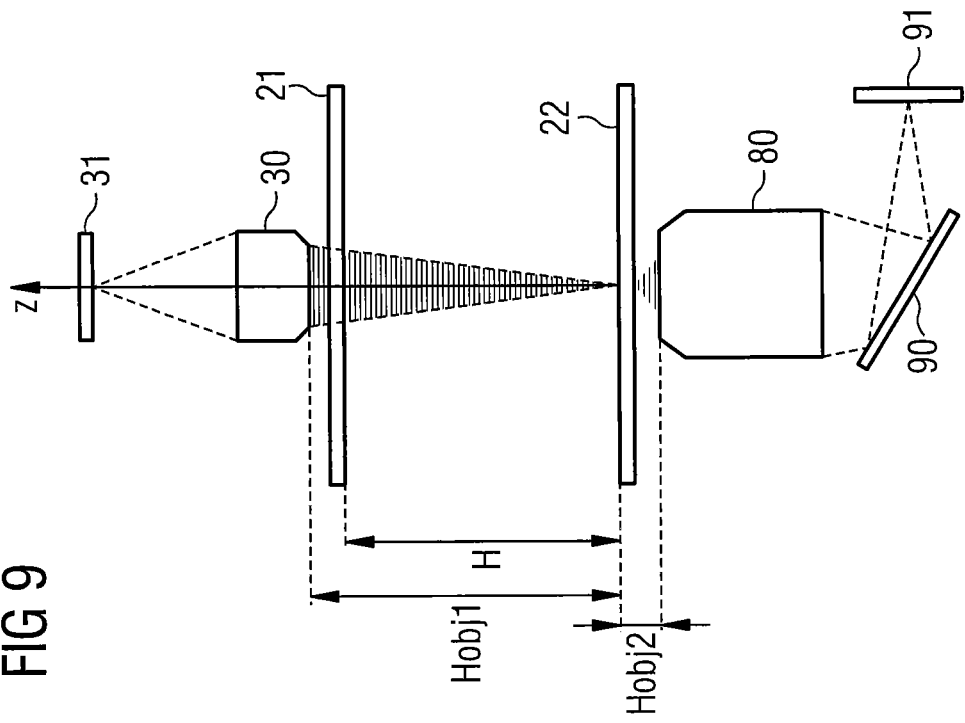
Figure 9:
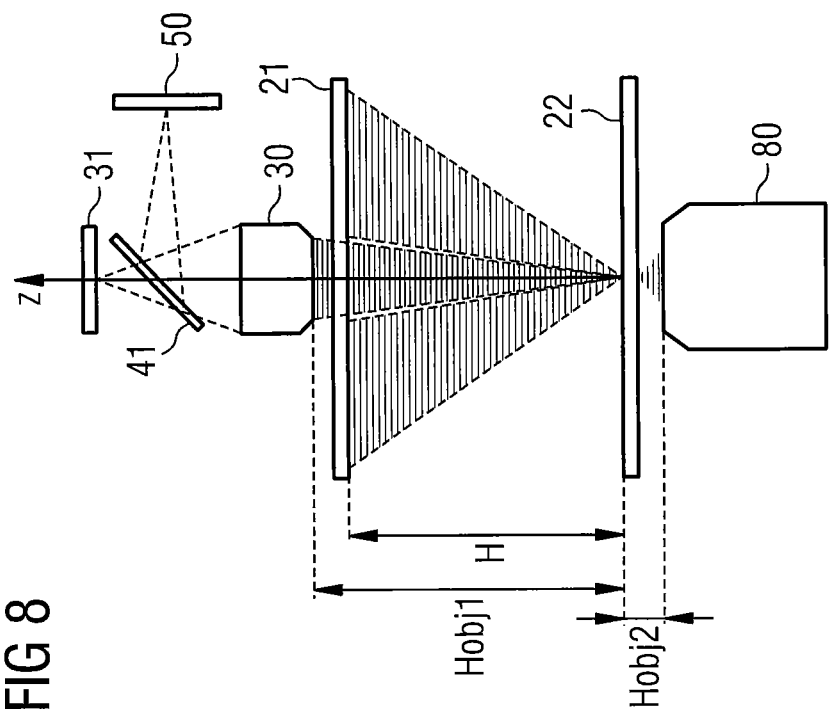
Figure 10A:
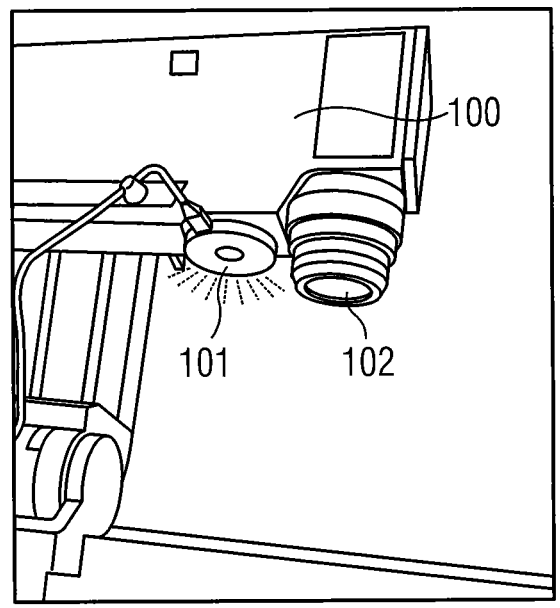
Figure 10B:
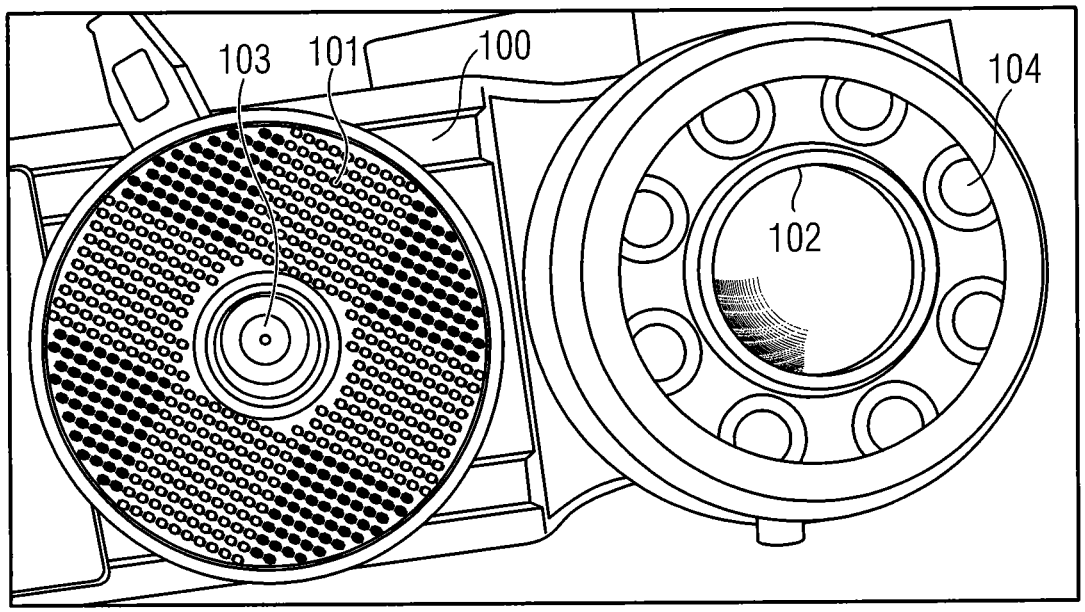
Figure 11A:
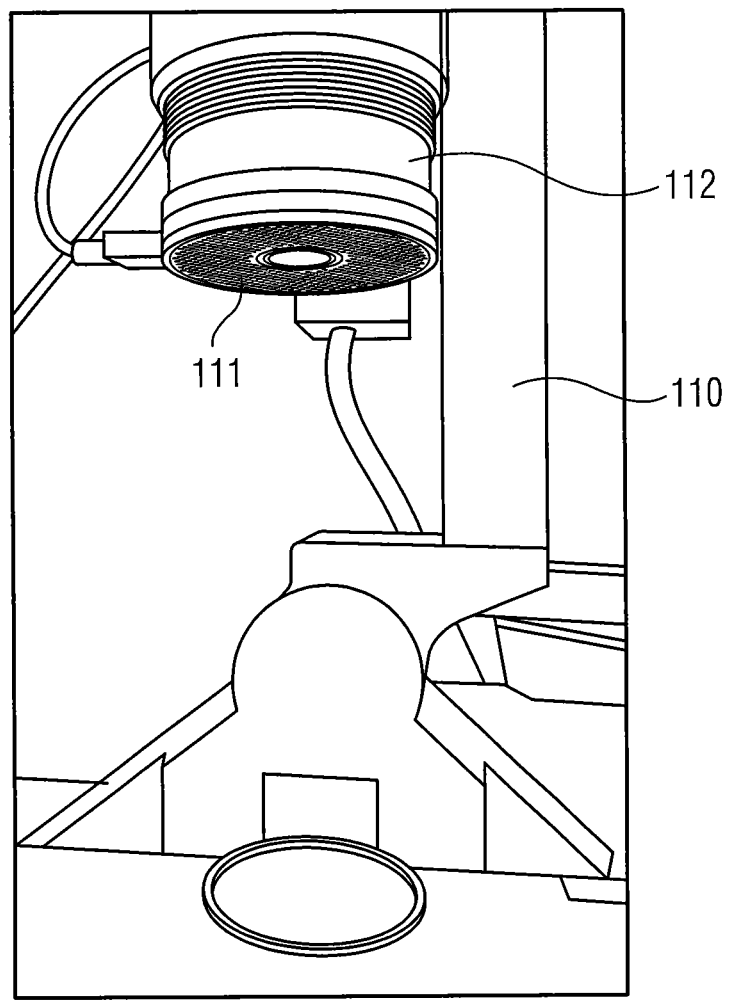
Figure 11B:
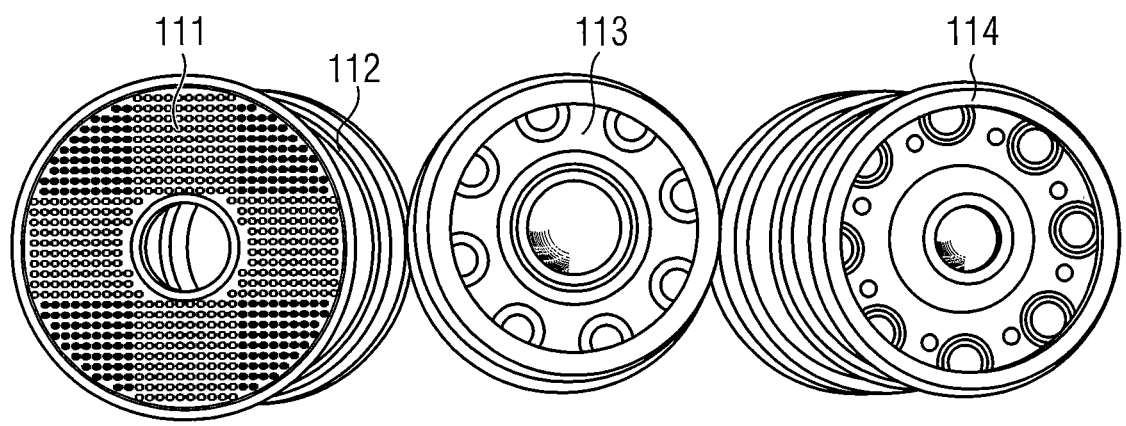
Figure 12A:
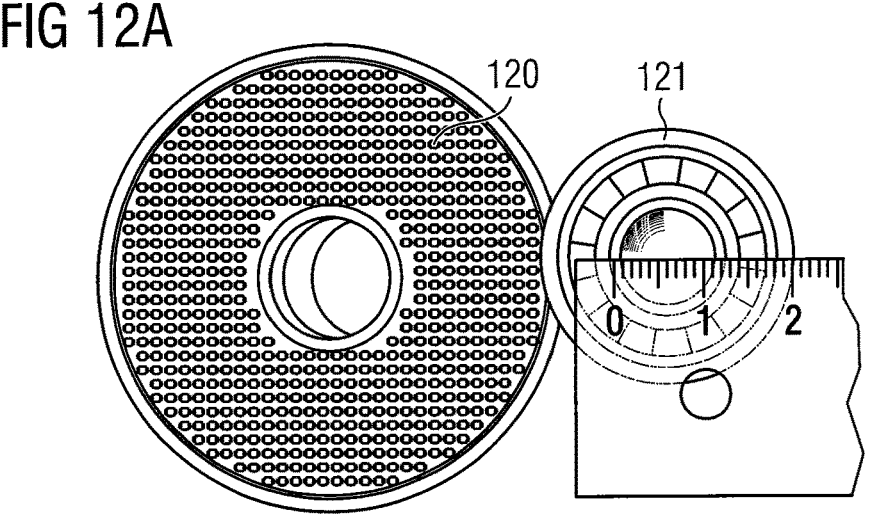
Figure 12B:
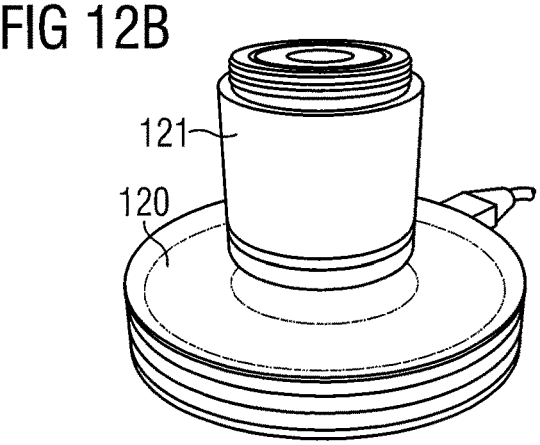
Figure 12C:
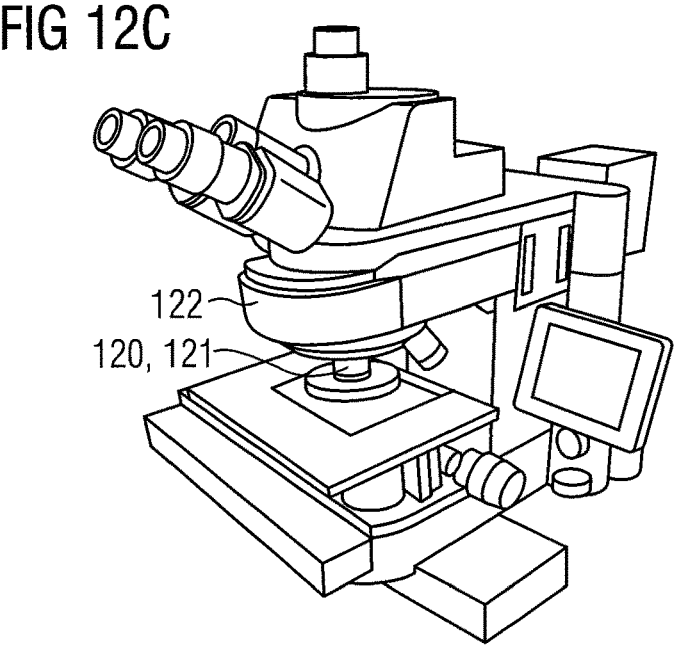
Figure 14:
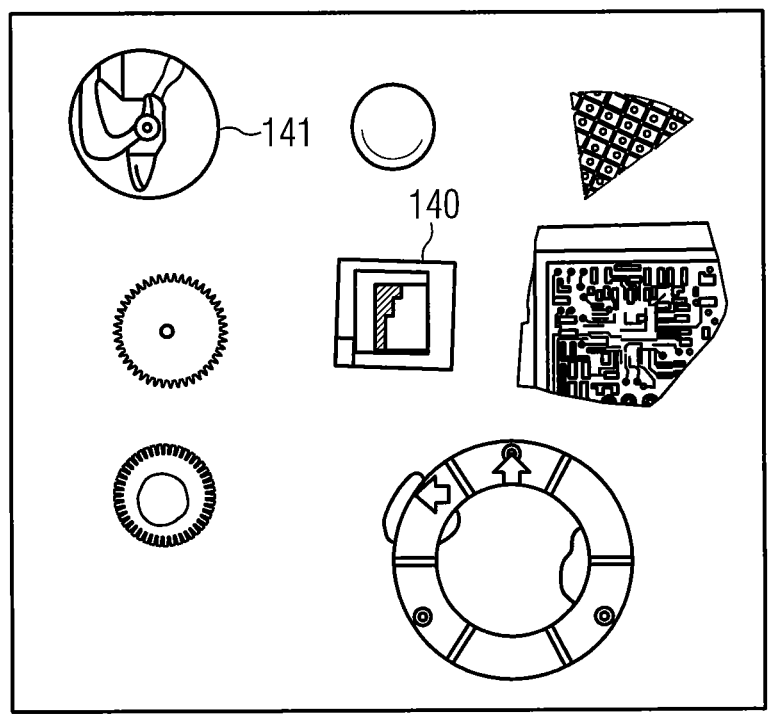
Figure 15A:
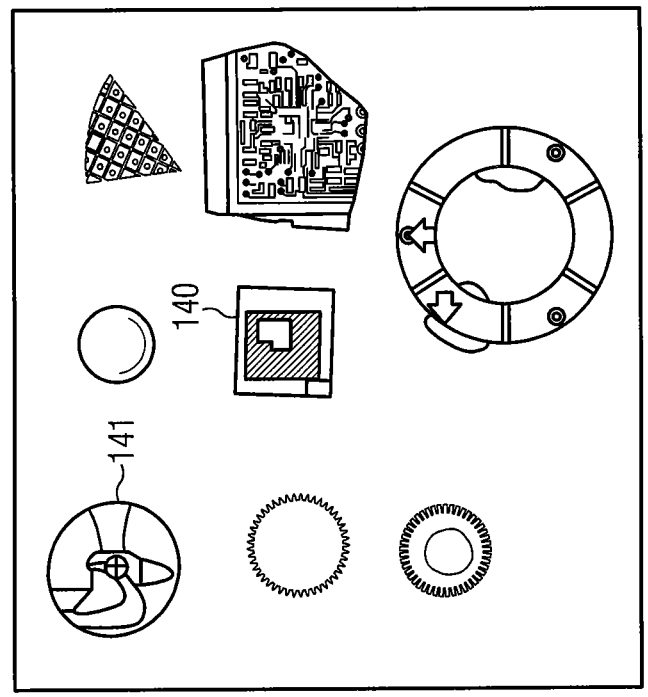
Figure 15B:
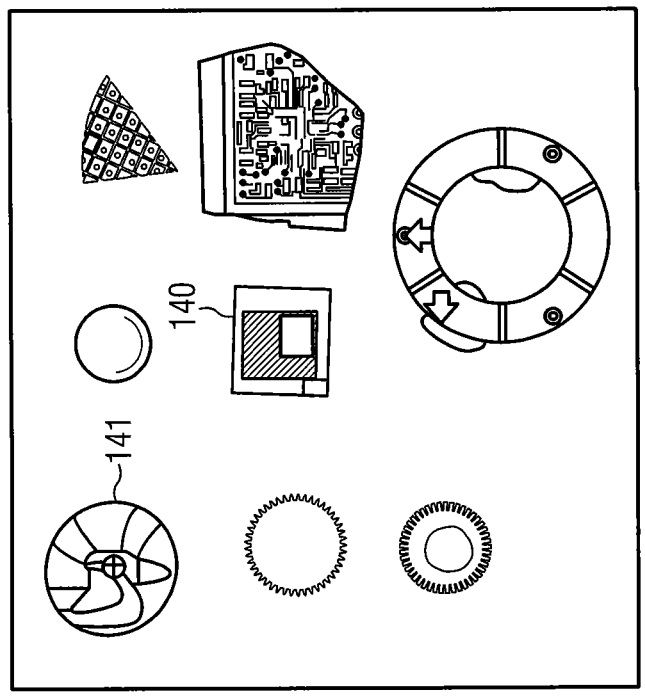
Figure 16A:
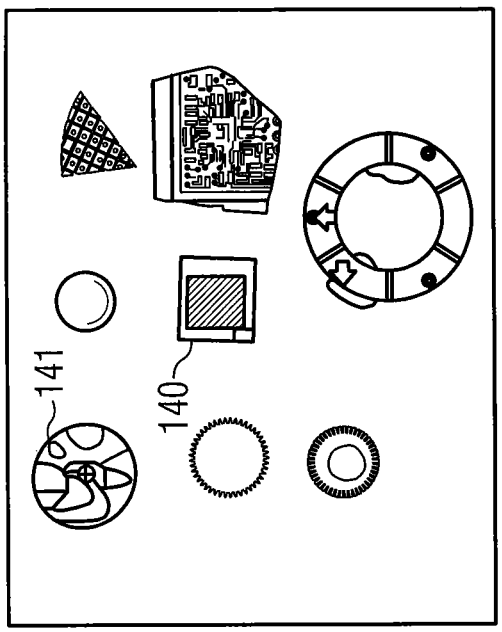
Figure 16B:
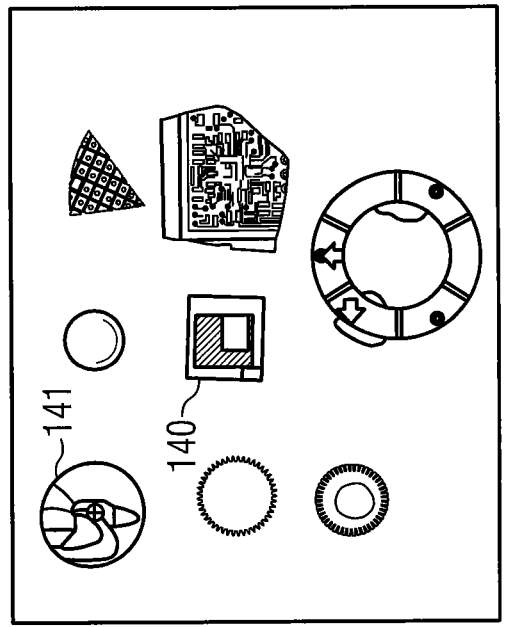
Figure 16C:
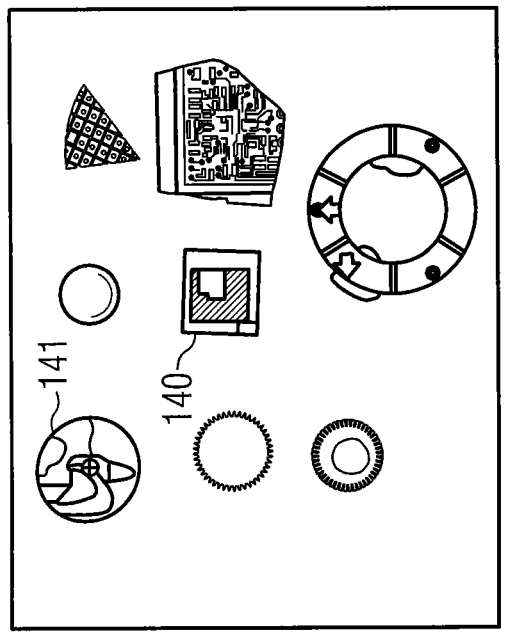
Figure 16D:
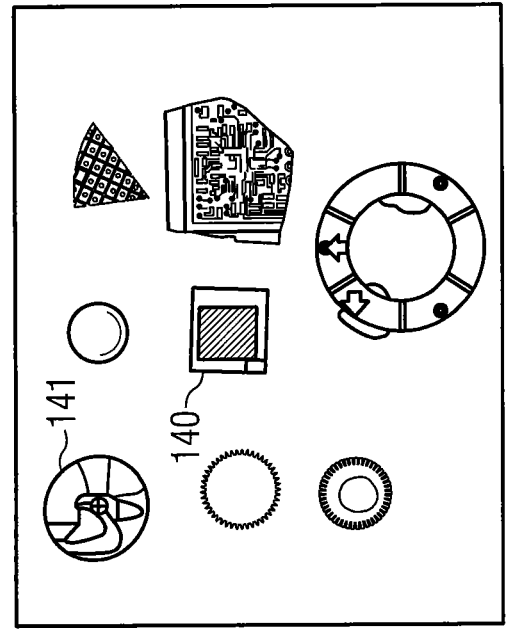
Figure 17:
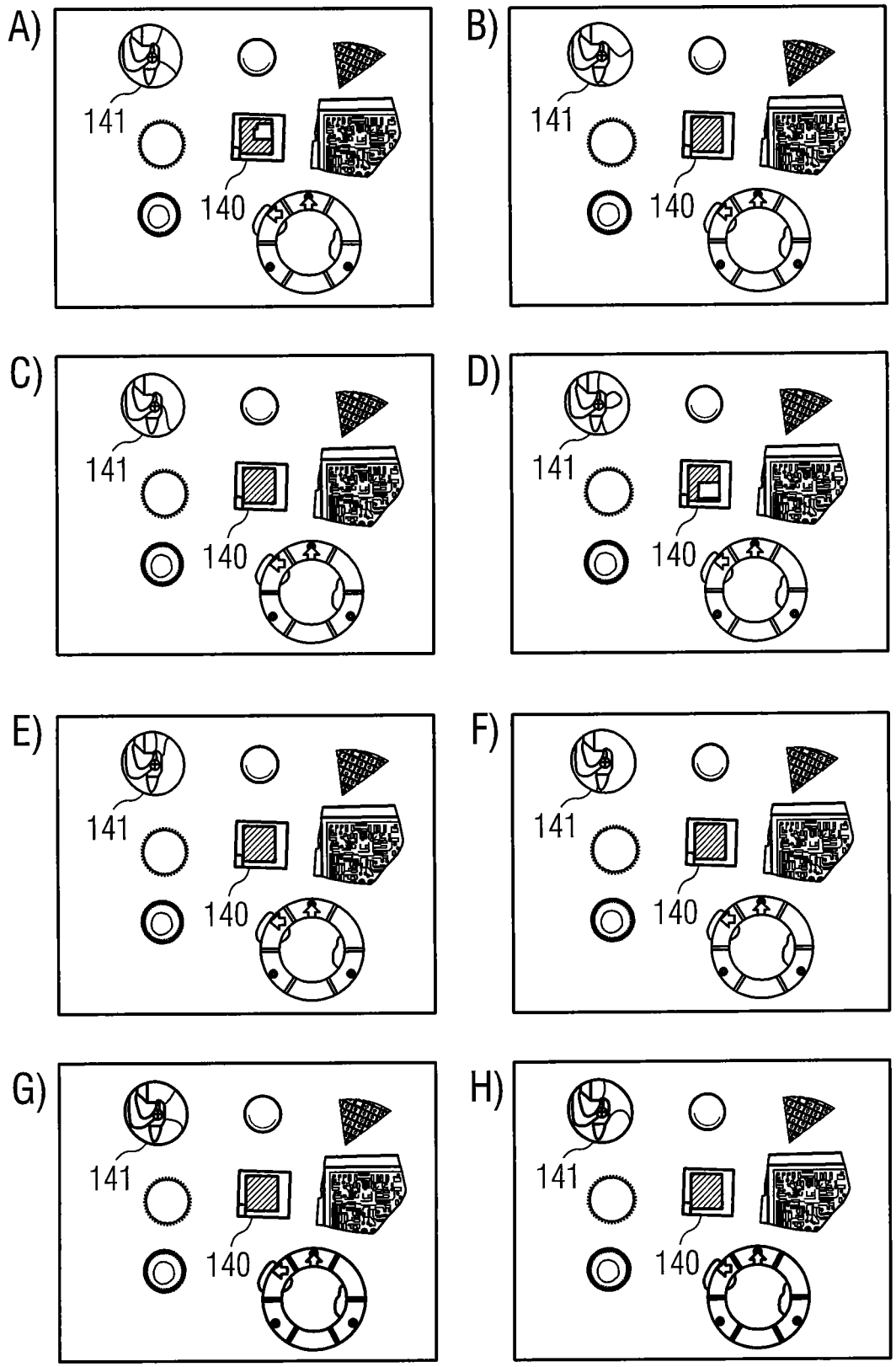
Figure 18:
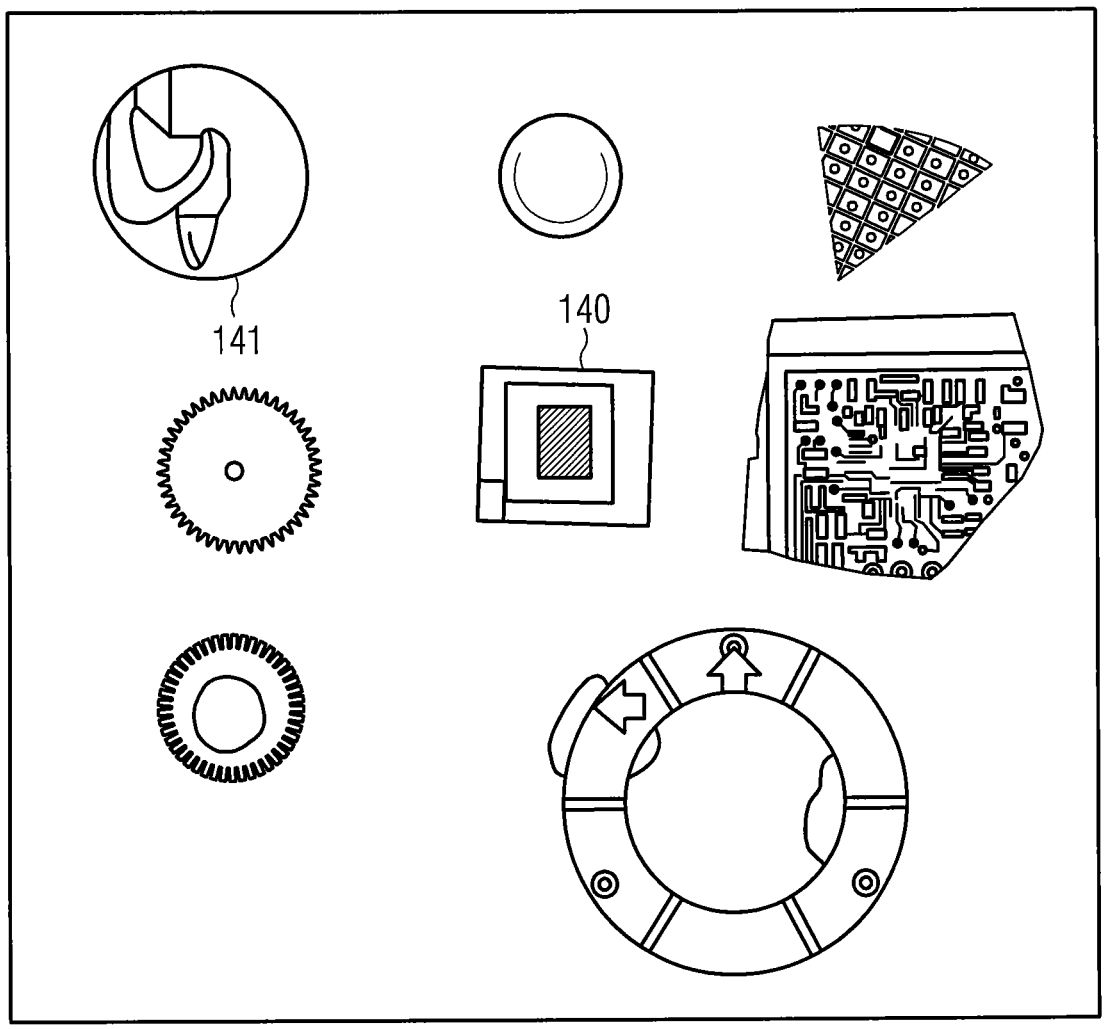
Figure 19:
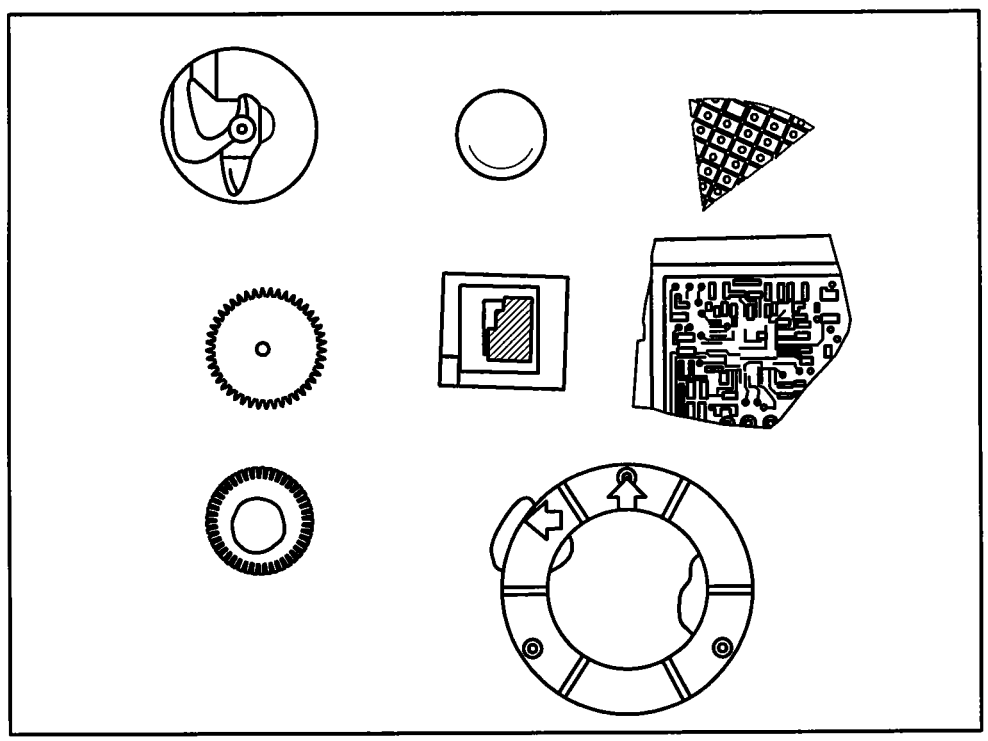
FIG. 19 shows an image in which the microscopic contrast was increased by combining a plurality of images. To this end, too, it is possible to use the individual images of FIGS. 15 to 17, wherein the results can vary depending on the employed group of individual images.
Figure 20:
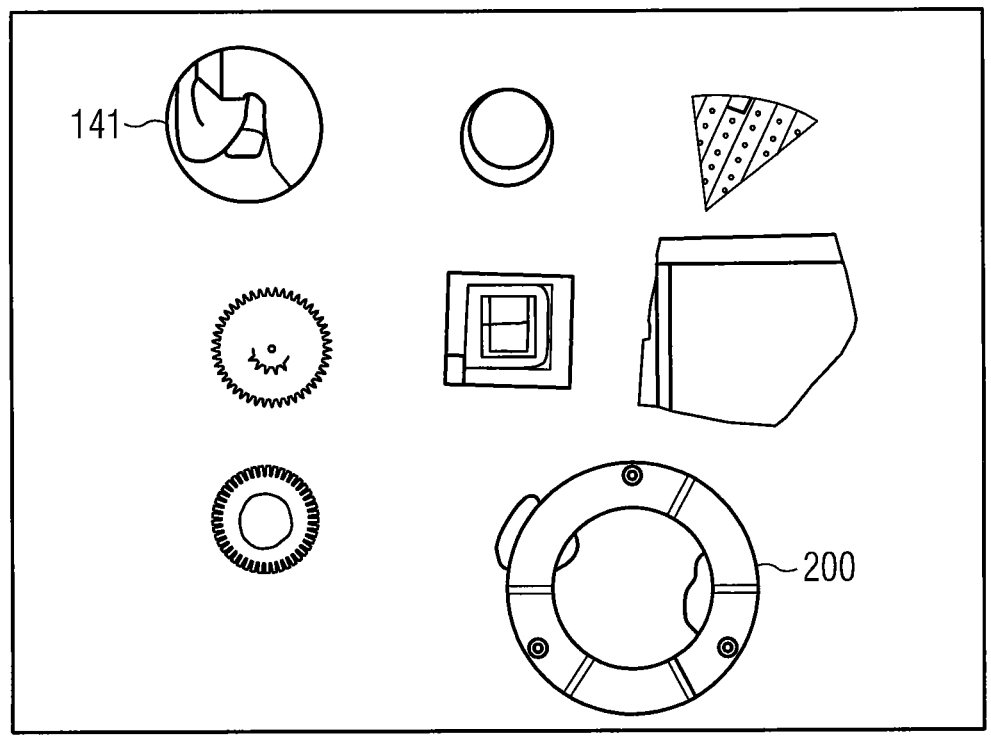
FIG. 20 shows a phase contrast image that was obtained by combining a plurality of images recorded with different illuminations. By way of example, surface inhomogeneities in a metal ring 200, imaged bottom right in the image, are better identifiable in the phase contrast image and volume defects in the element 141, which is a glass sphere, become visible.
Figures 21A, 21B:
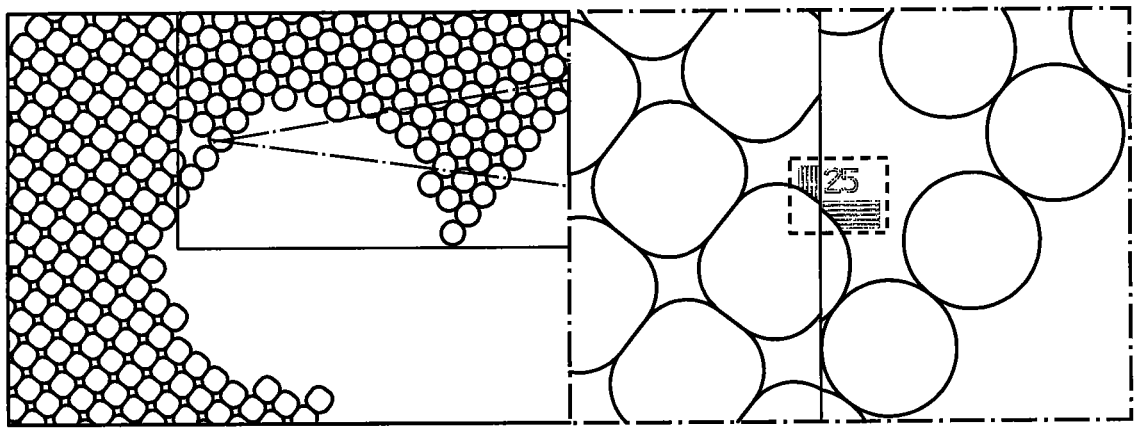
Figures 21C, 21D, 21E, 21F:
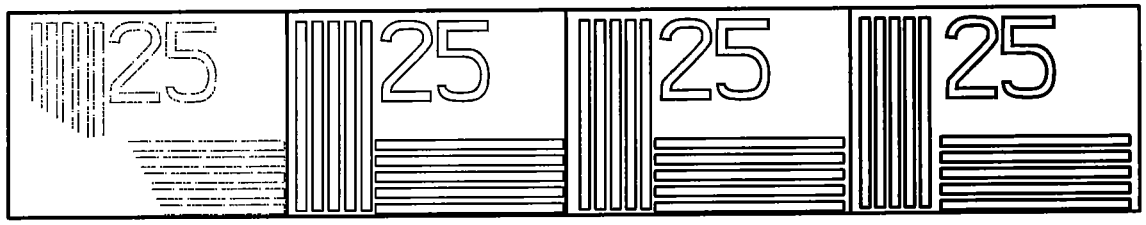

FIGS. 21A to 21F illustrate an improvement of the resolution above a value corresponding to the numerical aperture of the employed objective. FIGS. 21A to 21C show images that were obtained using an optical unit with a low numerical aperture, wherein, additionally, reflections of the light-emitting diodes of an illumination device have a negative influence on the image in the recorded region. Here, FIG. 21B is a magnified portion of FIG. 21A and FIG. 21C is a magnified portion of FIG. 21B. FIGS. 21D to 21F show recordings of the portion of the FIG. 21C, which were obtained with a higher optical resolution corresponding to a higher numerical aperture. The resolution improves from FIG. 21D to FIG. 21F. A corresponding effect can be obtained if a plurality of images recorded by the objective of FIG. 21C are combined with different illumination settings. By increasing the resolution, it is also possible to increase a possible range for digital zoom, particularly in the case of overview images.

Hence, it is possible to obtain a result image with improved image properties by combining a plurality of images that were recorded with different illuminations.

The images illustrated in FIGS. 14 to 21 only serve for elucidation purposes and the actually obtained results can vary depending on the recorded, depending on an employed objective, depending on the employed illuminations and depending on the type of combination of the individual images.

The invention claimed is:
1. A device for recording images, comprising:
an image-recording device;
an illumination device arranged around an optical axis of the image-recording device;
a further image-recording device; and
at least one of a further illumination device that couples light into a beam path of the image-recording device, or an additional illumination device that couples the light into a beam path of the further image-recording device,
wherein the illumination device has a cut-out to facilitate a passage of light to the image-recording device,
wherein the illumination device has a plurality of independently actuatable illumination portions,
wherein the image-recording device and the illumination device are arranged on a same side of a specimen plane of the image-recording device,
wherein, with respect to the image-recording device, the further image-recording device is on an opposite side of the specimen plane,
wherein an angle between adjacent illumination portions of the illumination device as seen from the specimen plane is less than or equal to an angle defined by a numerical aperture of the image-recording device, and
wherein the further image-recording device differs from the image-recording device with respect to at least one of numerical aperture, working distance, magnification or resolution.

2. The device of claim 1, wherein the angle between adjacent illumination portions of the illumination device is at least 10% smaller than the angle defined by the numerical aperture of the image-recording device.

3. The device of claim 1,
wherein the plurality of illumination portions comprise a plurality of light source elements, and
wherein the light source elements are actuatable individually and/or segment-by-segment.

4. The device of claim 3, wherein different light source elements have different properties in respect of a spectral range and/or polarization.

5. The device of claim 1, wherein the illumination device comprises an areal light source and selectively actuatable shadowing elements for dimming respective parts of the areal light source.

6. The device of claim 1, wherein the illumination device is ring-shaped with an internal diameter (Rin) and an external diameter (Rout), wherein the internal diameter (Rin) defines the cut-out.

7. The device of claim 1, wherein the further illumination device comprises at least one of a movable light source element or a plurality of independently actuatable further illumination portions.

8. The device of claim 1, further comprising:
a control device,
wherein the control device is configured to actuate the illumination device sequentially for activating various illumination portions in order to illuminate a specimen in the specimen plane at different angles and/or from different directions and to actuate the image-recording device in order to obtain a corresponding plurality of images for various actuations of the illumination device.

9. The device of claim 8, wherein the control device is further configured to combine the plurality of images to form a result image.

10. The device of claim 9, wherein the control device is configured to carry out one or more of the following when combining the plurality of images to form a result images:
 a reflection correction,
 an improvement in the resolution,
 an improvement in contrast,
 a determination of a z-map of the specimen,
 a determination of a phase contrast image, or
 an improvement in a depth-of-field range.

11. The device of claim 9, wherein the control device is further configured to evaluate a quality of the result image and, depending on the evaluation, to modify the sequential actuation of the illumination device and/or a selection of images to be combined.

12. A method for recording a plurality of images using a device comprising:
 an image-recording device;
 an illumination device arranged around an optical axis of the image-recording device;
 a further image-recording device; and
 at least one of a further illumination device that couples light into a beam path of the image-recording device, or an additional illumination device that couples the light into a beam path of the further image-recording device,
 wherein the illumination device has a cut-out to facilitate a passage of light to the image-recording device,
 wherein the illumination device has a plurality of independently actuatable illumination portions,
 wherein the image-recording device and the illumination are arranged on a same side of a specimen plane of the image-recording device;
 wherein, with respect to the image-recording device, the further image-recording device is on an opposite side of the specimen plane,
 wherein an angle between adjacent illumination portions of the illumination device as seen from the specimen plane is less than or equal to an angle defined by a numerical aperture of the image-recording device, and
 wherein different illumination portions of the illumination device of the device are activated for various images of the plurality of images,
the method comprising:
combining the plurality of images to form a result image with improved image properties.

* * * * *

UNITED STATES PATENT AND TRADEMARK OFFICE
CERTIFICATE OF CORRECTION

PATENT NO. : 10,948,705 B2  
APPLICATION NO. : 16/065263  
DATED : March 16, 2021  
INVENTOR(S) : Gaiduk et al.

Page 1 of 1

It is certified that error appears in the above-identified patent and that said Letters Patent is hereby corrected as shown below:

On the Title Page

Item (30), insert:  
-- Dec. 23, 2015 (DE) ...................... 102015122712.6 --

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*